March 1, 1949.  W. H. ROBERTSON  2,463,206
CONTROL MECHANISM FOR DUAL CAMERA SHUTTERS
Filed Feb. 14, 1944  9 Sheets-Sheet 5

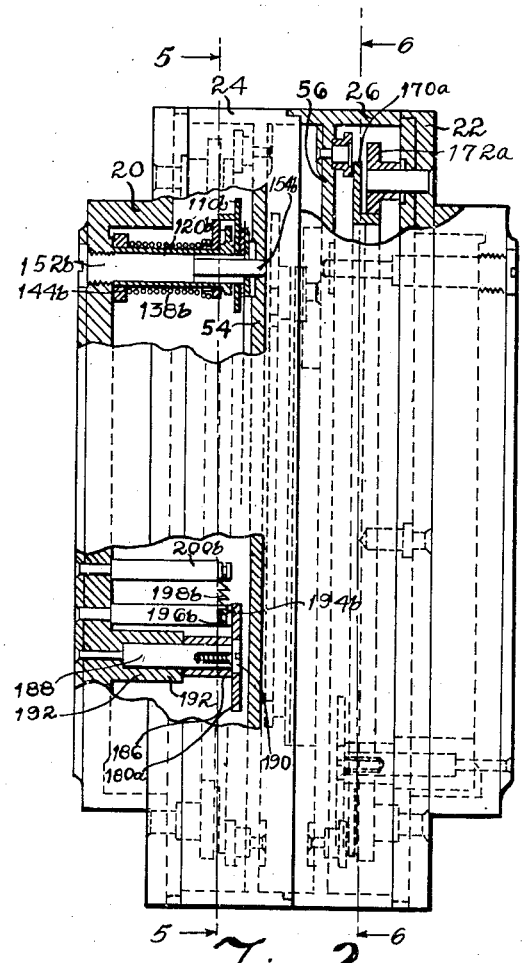

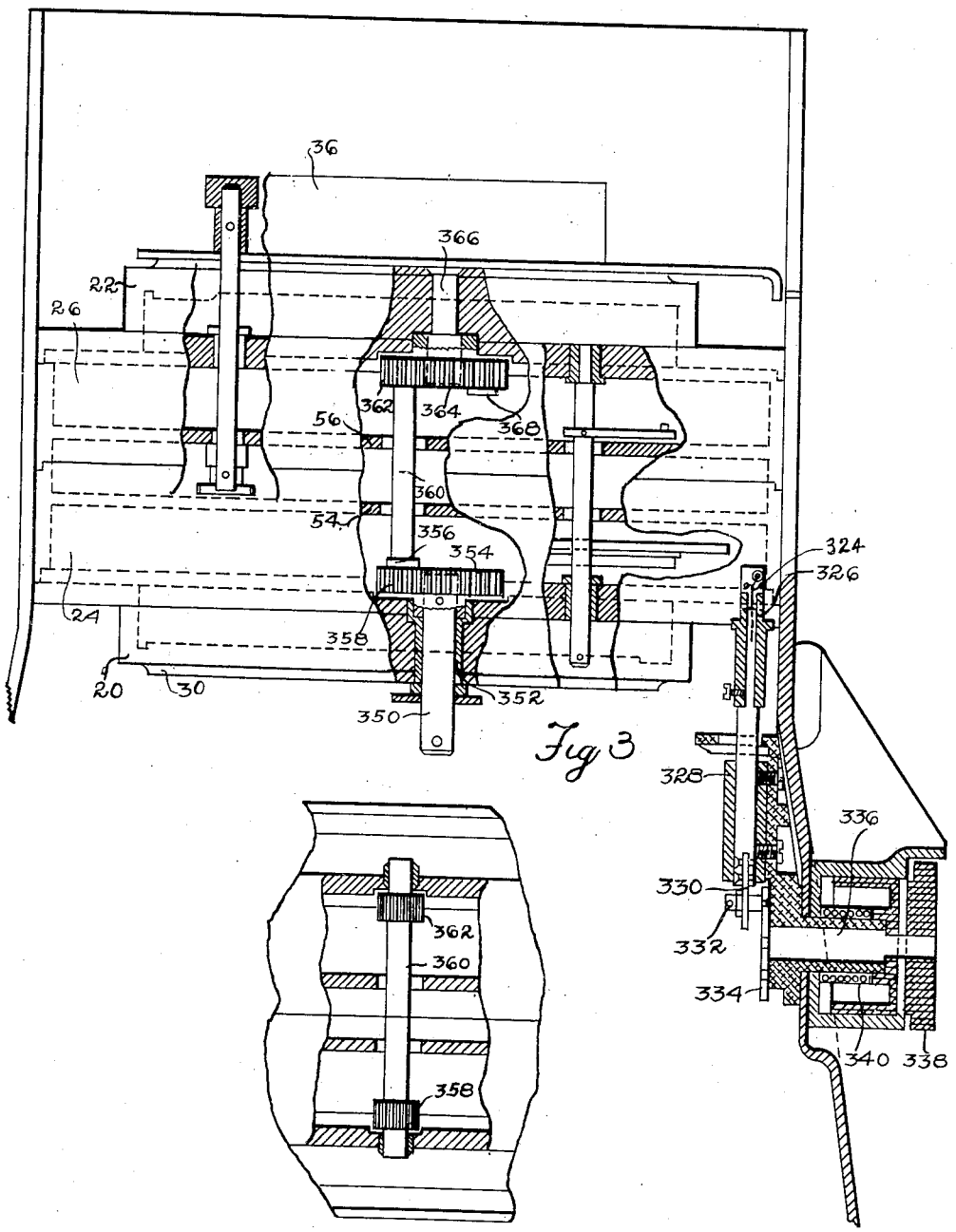

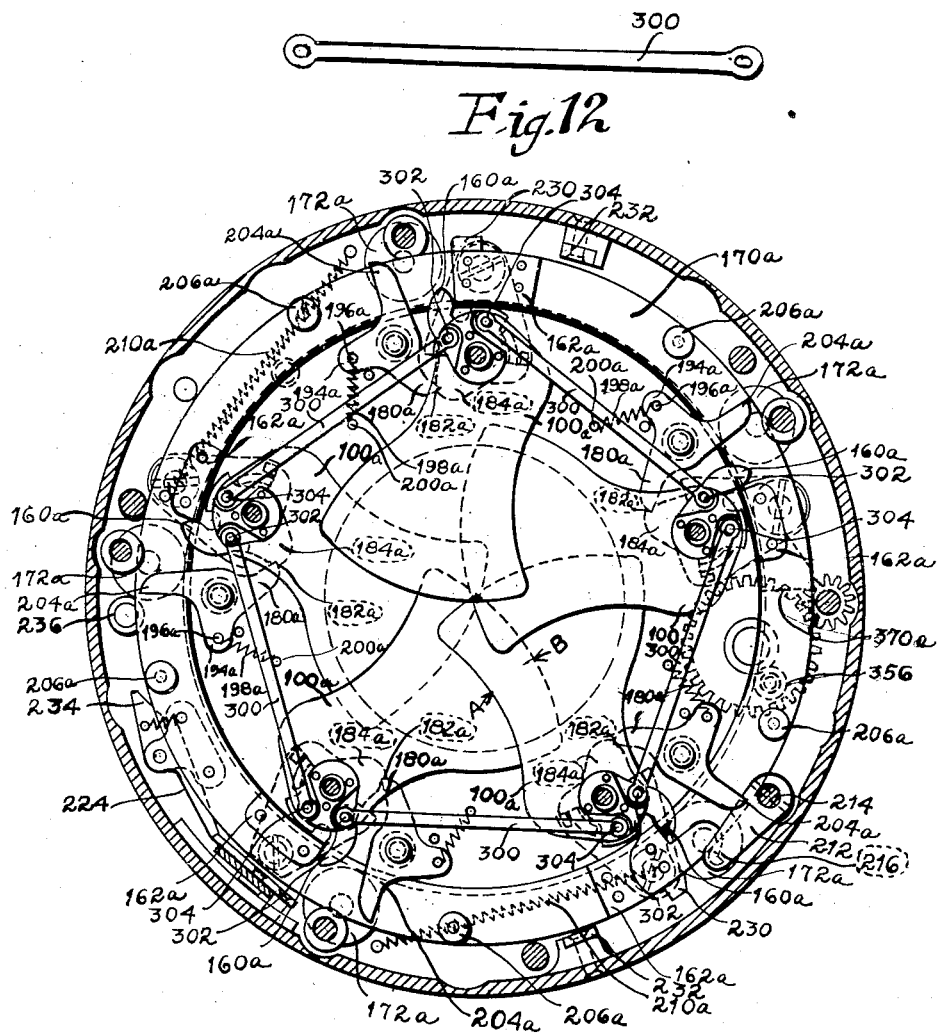

INVENTOR
William H. Robertson
BY
Henry G. Dyberg
ATTORNEY

March 1, 1949.   W. H. ROBERTSON   2,463,206
CONTROL MECHANISM FOR DUAL CAMERA SHUTTERS
Filed Feb. 14, 1944                                      9 Sheets-Sheet 7

INVENTOR
William H. Robertson
BY Henry G. Dyberg
ATTORNEY

March 1, 1949. W. H. ROBERTSON 2,463,206
CONTROL MECHANISM FOR DUAL CAMERA SHUTTERS
Filed Feb. 14, 1944 9 Sheets-Sheet 8
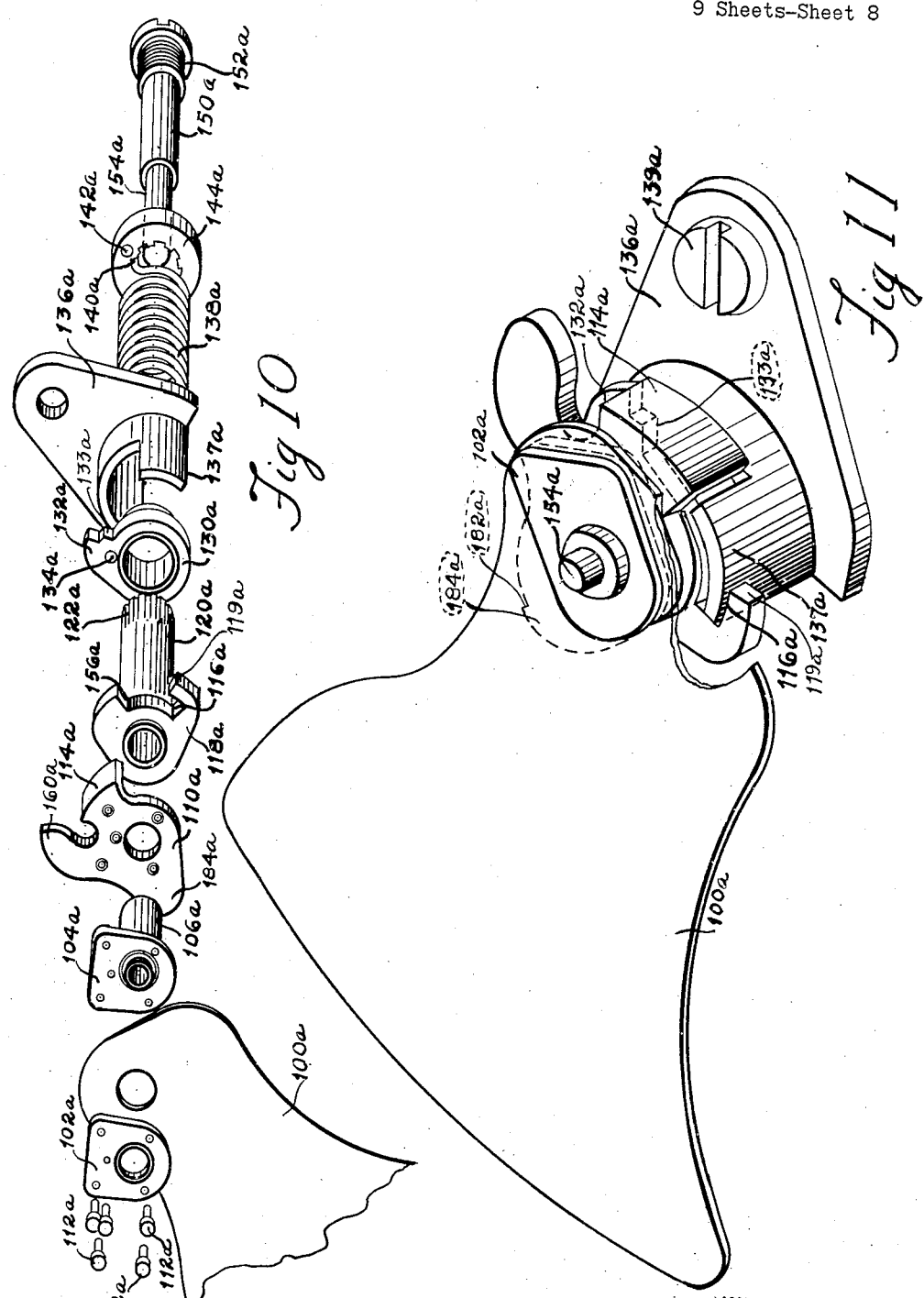
INVENTOR
William H. Robertson
BY Henry G. Dybvig
ATTORNEY

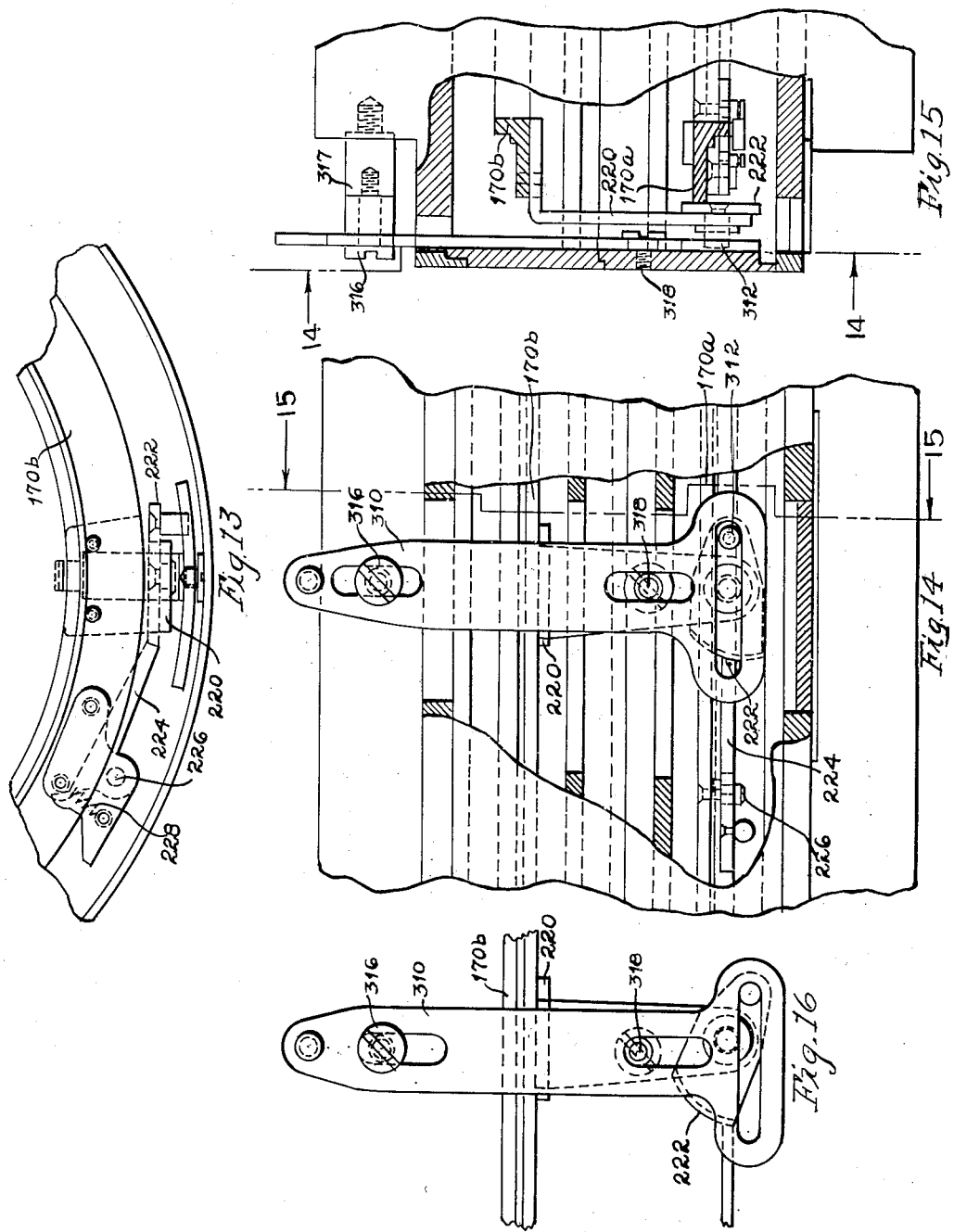

Patented Mar. 1, 1949

2,463,206

UNITED STATES PATENT OFFICE 2,463,206

CONTROL MECHANISM FOR DUAL CAMERA SHUTTERS

William H. Robertson, Dayton, Ohio, assignor to The Globe Industries, Inc., Dayton, Ohio, a corporation of Ohio Application February 14, 1944, Serial No. 522,321

13 Claims. (Cl. 95—63)

This invention relates to a shutter mechanism for a camera and more particularly to a high speed shutter mechanism permitting light to pass for an extremely short period of time.

An object of this invention is to provide a shutter mechanism, wherein two shutters are used, one of which opens the light passage and the other of which operates to close the light passage.

Another object of this invention is to provide a shutter mechanism for a camera wherein the shutter mechanism has a period in which to accelerate before actually beginning to open the light passage.

Another object of this invention is to provide a pair of shutter mechanisms, one of which is used for opening the light passage and the other for closing the light passage, said shutter mechanisms each having a movement through which the mechanism is accelerated before beginning to open and close the light passage, to thereby rapidly open and close the passage.

Another object of this invention is to provide a pair of shutter mechanisms, one of which opens the light passage and the other closes the light passage, each of said shutter mechanisms having an acceleration period prior to the operative movement thereof, one of the shutter mechanisms used in closing the light passage beginning its acceleration period at a later time than the beginning of the acceleration period of the shutter mechanism used in opening the light passage, so as to permit unobstructed passage of the light for a short interval of time.

Another object of this invention is to provide a control mechanism for a dual shutter device wherein the control mechanism causes both shutters to operate simultaneously during the exposure of the film and causing the shutter devices to operate in seriatim when resetting the shutter mechanism, so as to first close the open shutter before opening the closed shutter to restore each of the shutters to their home position in readiness before exposing the succeeding film without admitting light to the film chamber.

Another object of this invention is to provide a delayed action mechanism for a dual shutter control of a camera, said delayed action mechanism being adjustable so as to cause the shutter closing the light passage to begin the closing thereof at a predetermined interval of time after the shutter opening the light passage has completely opened the light passage.

Another object of this invention is to provide a spring motor for a shutter mechanism wherein the spring motor functions as a shock absorber at the end of the operative movement.

Another object of this invention is to provide a dual shutter mechanism and an iris mechanism mounted between the lenses of a camera.

Another object of this invention is to provide a housing for the lenses, a dual shutter mechanism and the iris, so that one lens and one shutter mechanism are positioned in each half of the housing and may be separated for inspection, repair, et cetera.

Other objects and advantages reside in the construction of parts, the combination thereof and the mode of operation, as will become more apparent from the following description.

In the drawings, Figure 1 discloses a diametrical cross sectional view of a lens housing, the lenses mounted therein and an iris mounted between the lenses, adapted for use in a camera.

Figure 2 is a side elevational view of a housing similar to the housing shown in Figure 1, with parts broken away to show some of the actuating mechanism for a dual shutter mechanism built into the housing shown in Figure 1.

Figure 3 is another view of the housing shown in its camera support, with parts broken away to show some of the actuating mechanism.

Figure 4 is another fragmentary view of a portion of the housing, with parts broken away to show a part of the actuating mechanism.

Figure 5 is a transverse cross sectional view taken substantially on the line 5—5 of Figure 2, showing the shutter blades or leaves in closed position.

Figure 10 is an exposed view of the spring motor assembly.

Figure 11 is an enlarged detail view of the motor assembly and a shutter leaf.

Figure 12 is an enlarged view of the link interconnecting the motors.

Figure 13 is an enlarged fragmentary view of the ring interconnecting mechanism.

Figure 14 is a fragmentary sectional view of the device disclosed in Figure 13, showing a side elevational view thereof taken substantially on the line 14—14 of Figure 15.

Figure 15 is another fragmentary sectional view taken substantially on the line 15—15 of Figure 14.

Figure 16 is a fragmentary perspective view with parts broken away to show the adjusting cam in a position different from the position shown in Figure 14.

Figure 1:
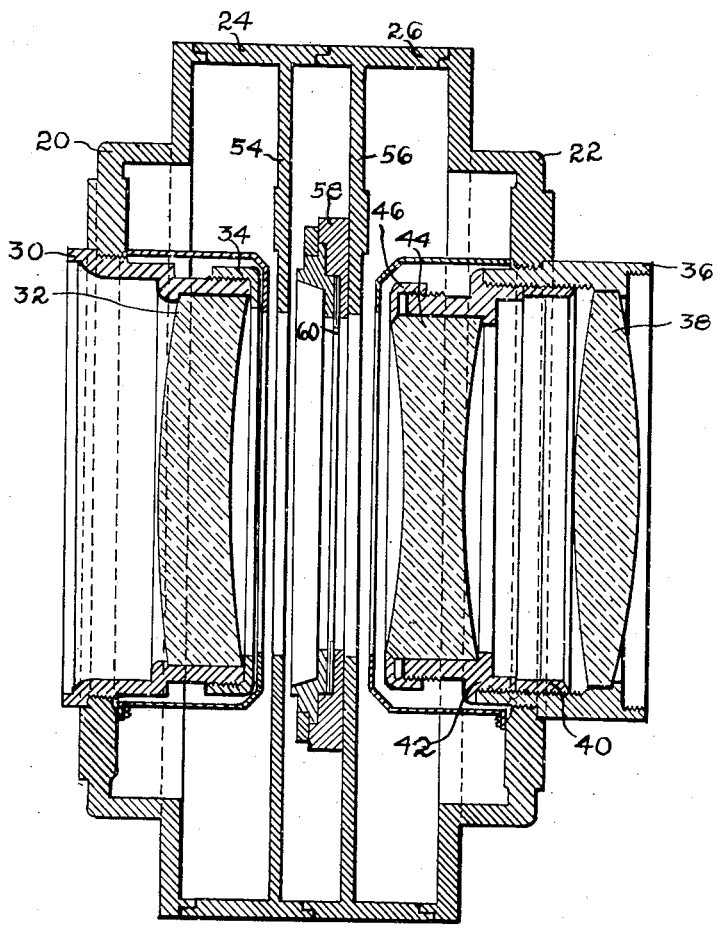
Figure 7:
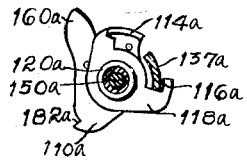
Figure 7 is a fragmentary sectional view of a portion of the actuating mechanism.

In Figure 1 the housing assembly has been shown in cross section to show the arrangement of the lenses and the position of the iris without the shutter mechanism.

Referring to the drawings, the housing assembly includes a pair of end members 20 and 22 and a pair of cylindrical spacing or supporting members 24 and 26. Members 20 and 24 are used in supporting one of the shutters and members 22 and 26 are used in supporting the other shutter. This housing assembly may be separated into two halves, one of which constitutes members 20 and 24 and the other constitutes members 22 and 26. The half of the assembly including members 20 and 24 has been shown in Figure 5 and the other half of the assembly including members 22 and 26 has been shown in Figure 6.

As may best be seen by referring to Figure 1, member 20 is provided with internal threads, threadedly engaging an annular lens supporting member 30, supporting a lens 32, which is held in position by a threaded collar or retaining member 34. Member 22 is also provided with internal threads, threadedly engaging an annular lens supporting member 36, supporting a lens 38, which is held in position by a threaded collar or retaining member 40. Member 36 is provided with internal threads that support a second lens supporting member 42, supporting a lens 44, held in position by an annular ring 46. It is to be noted that a considerable space is found between the lens 32, supported in one-half of the housing, and the adjacent lens 44, supported in the other half of the housing.

The pair of annular spacing and supporting members 24 and 26 are mounted between members 20 and 22. Member 24 is provided with an apertured partition 54 and member 26 is provided with an apertured partition 56. The apertured partition 56 supports an annular ring 58 supporting the iris 60 and the associated mechanism. The structure shown thus far is illustrative of the lens mountings and the positioning of the iris between the lenses. As may be clearly seen in Figure 1, there is a clearance between the iris 60 and the lens 32 and there is a clearance on the other side between the iris 60 and the lens 44. These two spaces may be utilized for a pair of shutters, one shutter for each space. The disclosure in Figure 1 has merely been shown for the purpose of describing the structure of the lens supporting mechanism and the iris supporting mechanism before inserting the shutter mechanism which has been incorporated into the structure, as will appear more fully from the description that follows. The disclosure in Figure 1 is illustrative of the lens supporting mechanism without being limited to this particular type of mechanism.

The shutter mechanism includes two sets of shutters, one of which is moving into open position when the other is being accelerated and advancing into closed position, together with means for controlling the timing of the shutters, so that the shutters emit light for a predetermined period of time. The mechanism for controlling the operation of the shutters is so constructed and arranged that the shutter actuating mechanism upon being reset, will operate in seriatim, so as to first close the shutter which has moved into open position before beginning the opening of the shutter that closed the light passage at the end of the exposure. The leaves or blades used in opening and closing the aperture overlap, so as to accelerate before making an exposure and are driven by individual motors, so that a light weight, quick acting, spring motor is used for each of the blades, rather than a heavy, large motor actuating all of the blades simultaneously, as will appear more fully from the description that follows.

Figure 6:
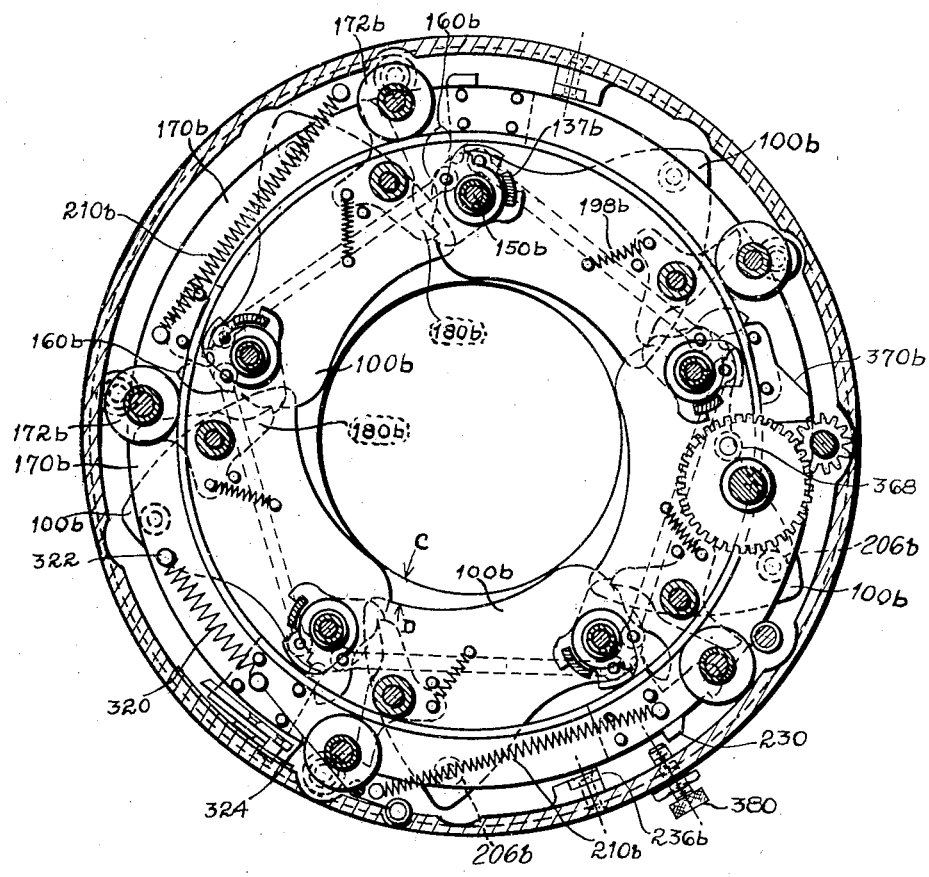
Figure 6 is another cross sectional view taken substantially on the line 6—6 of Figure 2, showing the shutter blades or leaves in open position.
Figure 8:
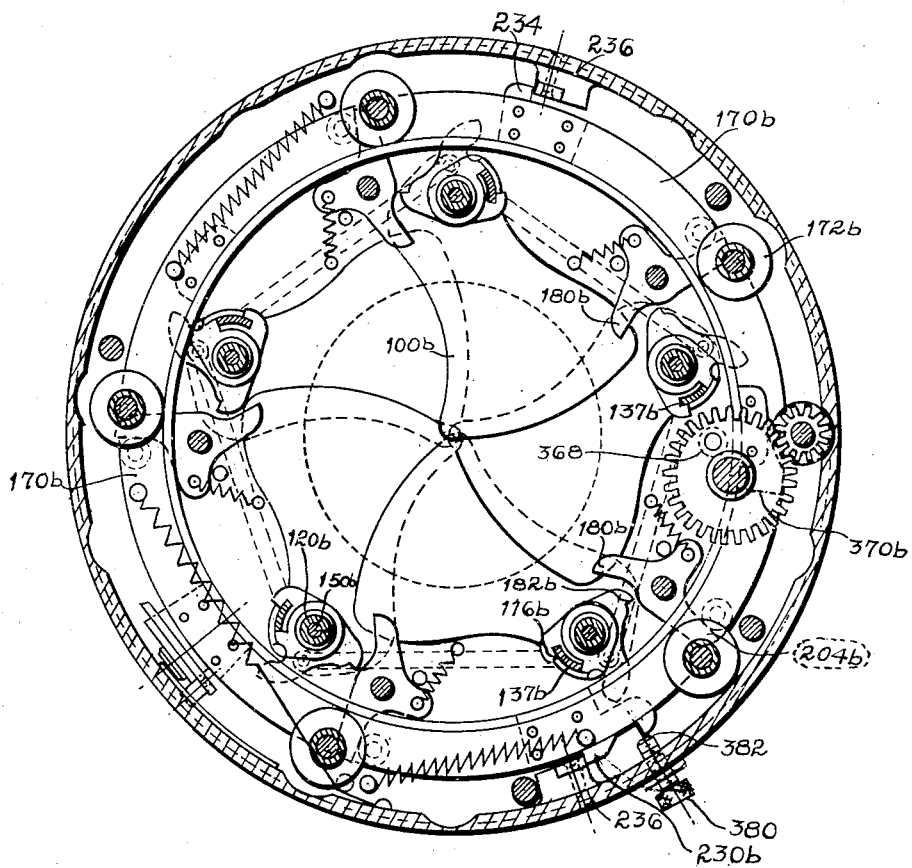
Figure 8 is a view similar to Figure 6, showing one of the shutters immediately after exposure.
Figure 9:
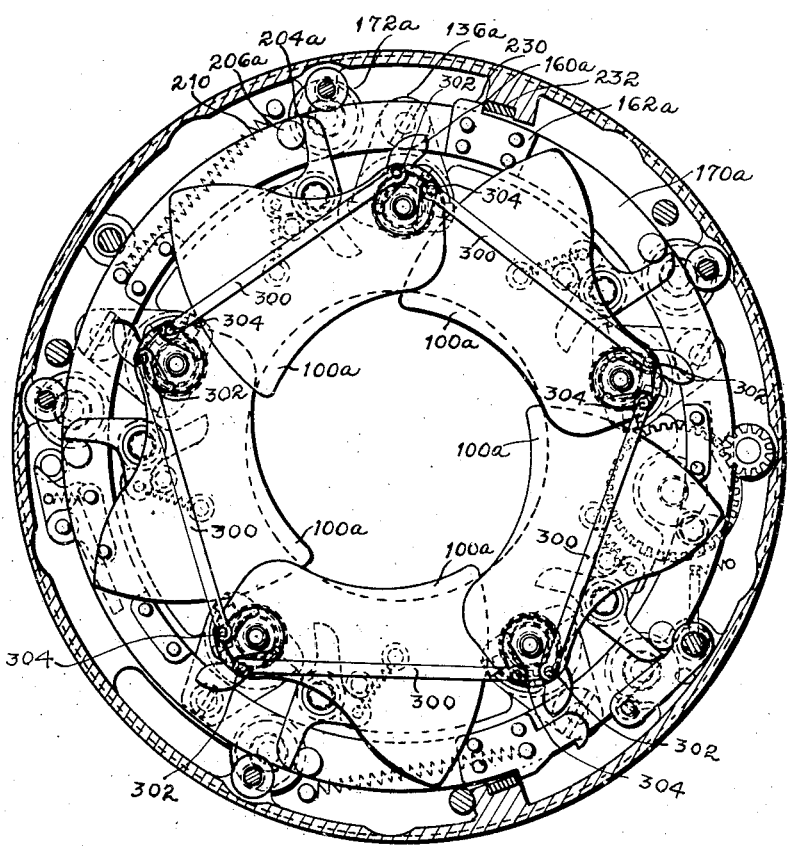
Figure 9 is a view similar to Figure 5, showing the shutter shown in Figure 5 immediately after exposure, that is, in open position.

Each shutter includes a plurality of blades 100a and 100b. In the embodiment shown herein five blades are incorporated into each shutter. As may best be seen by referring to Figure 5, the blades of one shutter that is normally closed in readiness for another exposure overlap each other a distance A—B. In Figure 6, the blades of the other shutter normally open and in readiness to terminate the exposure, have been shown in open position. In Figure 6 it can readily be seen that the blades must travel a distance C—D before they begin to close the opening through the iris. The distance that the blades travel before beginning to close the opening through the iris depends upon the size of the opening in the iris. As is well known to those skilled in the art, the size of this opening varies from time to time, depending upon the setting of the iris at the will of the photographer. As may best be seen by referring to Figures 10 and 11, the leaves or blades 100 are individually mounted and driven by a motor mechanism that will now be described.

*Individual motor mechanism*

The actuating motor mechanism for the shutter blades moving into open position when making an exposure and the motor mechanism for actuating the other set of shutter blades into closed position are identical with the exception of the angular position of the blades or leaves. That being the case, only one motor mechanism will be described. Wherever it is found feasible for the sake of clearness, the reference numerals pertaining to the motor mechanism for opening the shutters will each be followed by the letter "a" and the reference numerals pertaining to the motor mechanism for closing the shutters will each be followed by the letter "b."

Figure 10 discloses an exploded view of the motor mechanism. Each blade of the shutter disclosed in Figure 5 is mounted between a retaining plate 102a and a retaining plate 104a attached to a tubular member 106a. A cam following member 110a is also secured to members 102a, 100a and 104a by a plurality of rivets 112a. These parts are riveted together into a unitary structure and rotate in unison. Member 110a is provided with an axially disposed lug 114a located beyond notch 116a found in member 118a integral with or fixedly attached to a tubular sleeve member 120a, having spline-like grooves or notches 122a in the end opposite member 118a. The lug 114a projects beyond the notch 116a and has limited oscillatory movement, as will appear more fully later.

A collar 130a, provided with a pawl 132a, is rotatably mounted on the tubular sleeve member 120a. This collar 130a is provided with an aperture 134a receiving one end (not shown) of a motor spring 138a having its opposite end 140a projecting into an aperture 142a in the splined collar 144a seated on the end of the tubular sleeve member 120a. The spring 138a may be wound or tensioned by properly positioning splined collar member 144a in the grooves 122a, so that the pawl 132a abuts the lug 114a, tending to rotate the lug 114a in a clockwise direction, as viewed in Figure 10. The leaf and the motor when assembled are mounted upon a stud 150a having screw threads 152a threadedly engaging member 20 and the extreme end of the stud 150a, that is, the reduced end 154a is seated in an aperture in the apertured partition 54. Stud member 150a forms a pivot or an axle, about which the leaf is operated.

The motor assembly is mounted partly within a semi-circular flange member 136a held in fixed position with respect to the housing by a screw 139a. This flange member 136a has an arcuate stop projection 137a extending into the slot 116a and normally disposed in the slot 116a. The member 136a is attached to the partition 54 by means of the bolt 139a.

The motor spring 138a functions as a motor and as a shock absorber. When the motor has been wound and then released, as more fully described hereinafter, the spring 138a actuates the collar 130a having the pawl 132a engaging the lug 114a integral with member 110a riveted to the blade 100a. Referring to Figure 11, the blade 100a is rotated in a clockwise direction at an extremely high rate of speed when making the exposure.

When the blade 100a approaches the open position, the spring 138a ceases to function as a motor, and instead, functions as a shock absorber, which will now be described. The lug 137a is stationary and is mounted in the slot 116a. Member 118a is biased in a counterclockwise direction, as viewed in Figure 11, by the spring 138a. Member 130a, mounted for rotary movement on the sleeve 120a, is biased in a clockwise direction by the spring 138a. When the blade 100a is in the position shown in Figure 11, the pawl 132a of member 130a engages the lug 114a. The shoulder 133a is then positioned in spaced relation from the projection 137a. When the spring motor is released, member 118a continues to be biased in a counterclockwise direction, as viewed in Figure 11, against the projection 137a. The blade 100a is rotated in a clockwise direction, as viewed in Figure 11, until the lug 114a engages the shoulder 119a. About that time the shoulder 133a is moved into contact with the projection 137a. The lug 114a is then clamped between the shoulder 119a and the pawl 132a, so as to arrest the movement of the blade in this position. It will not continue to rotate in a clockwise direction by virtue of the shoulder 119a arresting the movement of the lug 114a. The blade will not tend to oscillate in a counterclockwise direction, for the reason that the pawl 132a follows the lug 114a, so as to clamp the lug 114a between the pawl 132a and the shoulder 119a. Due to the fact that the shoulder 119a is biased in a counterclockwise direction by the spring 138a and the pawl 132a is biased in a clockwise direction by the spring 138a, the lug 114a and the blade are then held stationary. The spring 138a first acts as a motor, propelling the blade 110a from one position to the other, and then functions as a shock absorber, for resiliently arresting the movement of the blade 100a.

The motor mechanism that has been described thus far has been described in connection with the shutters that are moved to open position during an exposure. As stated above, a pair of shutters normally in open position terminate the exposure by moving into closed position. Spring motors are used for closing these shutters. The spring motors used for closing the shutters shown in Figure 6 are identical to the spring motors described above, excepting the relative position of the motors with respect to the blades or leaves, which motors are identified by the suffixes "b" in the reference numerals. The spring 138b is so tensioned that as the pawl 180b releases the spring, the blades 100b snap into closed position.

All of the leaves of one shutter mechanism operate in timed relation by means of a release and synchronizing mechanism, which will now be described.

*Release and synchronizing mechanism*

The spring motors actuating the blades 100a are released simultaneously by a suitable trigger mechanism used in releasing the pawls 180a. This trigger releasing mechanism includes a motor control ring 170a that is rotatably mounted in close proximity to each of the motors actuating the blades 100a. Each of the spring motors actuating the leaves 100b into closed position are released by a similar trigger mechanism, driven by a suitable spring mechanism in timed relation with respect to the releasing mechanism for the blades 100a. Means have been provided for correlating the movements and the timing of the two release mechanisms, as will appear more fully from the detailed description thereof.

In Figure 5 the leaves or blades 100a are shown in closed position. The ear or extension 160a of the cam following member 110a engages a restoring member 162a fixedly attached to the ring 170a extending into close proximity to each of the motors and journalled within the housing for the lenses. This ring 170a is provided with a flange engaging a plurality of circumferentially disposed rollers 172a which form roller bearings for the ring.

When restoring member 162a on the ring 170a actuates the ear 160a into the position shown in Figure 5, a pawl 180a engages a notch 182a in the ear 184a of cam following member 110a. As best seen in Figure 2, the pawl 180a is mounted upon a sleeve 186 journalled upon a pintle 188 and held in position by a suitable screw 190 and attached to a suitable boss 192 projecting inwardly from end member 20. Pawl 180a is provided with a lug 194a having fixedly attached thereto a stud 196a having attached thereto a spring 198a carried upon a pin 200a fixedly attached in the end frame member 20. The spring 198a tends to rotate the pawl members 180a in a counterclockwise direction, as viewed in Figure 5. Pawl members 180a are each provided with an extension 204a overlying the ring 170a in the path of a stud 206a pivotally mounted upon the ring 170a.

A like mechanism is used in releasing the spring motors shown in connection with the blades 100b used in terminating the exposure. The motor control ring 170b shown in Figure 6 carries the release mechanism substantially identical to that described in connection with the release mechanism and the ring 170a shown in Figure 5.

The rings 170a and 170b are biased in a clockwise direction, as viewed in Figures 5 and 6 respectively, by helical springs 210a and 210b respectively. The lower ring 170a, that is, the one shown in Figure 5, is held in the position shown by a pawl 212 pivotally mounted at 214 and engaging a detent 216 fixedly attached to the ring 170a. The upper ring 170b, shown in Figure 14, is held in the position shown by a downwardly projecting lever or L-shaped bracket 220, having an eccentric cam 222 engaging a pawl 224 pivotally mounted at 226 and biased in a clockwise direction, as viewed in Figure 13, by a helical spring 228. The radial movement of the pawl 224 is limited by a suitable stop, not shown, so that the spring 228 cannot rotate the pawl 224 beyond the eccentric cam 222. The bracket 220, the eccentric cam 222 attached to the bracket and the pawl 224 cooperate to hold the upper ring in locked position. The eccentric cam 222 is adjustable so as to adjust the relative position of the two rings 170a and 170b, thereby changing the time of the exposure, as will appear more fully later.

By oscillating the pawl 212 in a counterclockwise direction, as shown in Figure 5, the ring 170a, that is, the ring shown in Figure 5, is released. The two springs 210a cooperate to rapidly rotate the ring 170a in a clockwise direction, as shown in Figure 5, until the studs 206a engage the extension 204a on the pawl 180a, so as to clear the notch 182a, thereby permitting the motor springs 138a to rapidly open the leaves 100a, so as to admit light to the camera, not shown. Reference is now being made to the leaves disclosed in Figure 5. The lower ring 170a, disclosed in Figure 5, will continue to rotate in a clockwise direction under the influence of the springs 210a until the stops 230 on the ring 170a engage the stops 232 on the housing. Shortly before the stops 230 engage the stops 232, the extension 234 of the pawl 224 will engage a roller 236 rotatably mounted in the housing, so as to actuate the pawl 224 in a counterclockwise direction to clear the eccentric cam 222. This will permit the upper ring 170b, shown in Figure 6, to continue its rotation until it is arrested by a stop mechanism which includes the extension 234 on the ring 170b engaging the stop 236.

The actuating springs 210a and 210b may be identical and tensioned the same. In the absence of extraneous influences, this should cause the rings 170a and 170b to rotate at the same rate of speed. If the two rings 170a and 170b rotate at the same rate of speed, the relative time of exposure would then be dependent entirely upon the relative position of the rings 170a and 170b. If these are so positioned that the distance from the releasing stud 206a to the extension 204a is only slightly less than the distance from the releasing roller 206b to the extension 204b, the period of time for the exposure would be quite short. This period of time may be increased by actuating the eccentric cam 222, so as to increase the distance from the releasing stud 206b to the extension 204b, thereby causing a lag between the ring 170a and the ring 170b. This increases the time of exposure.

In spite of the fact that the studs 206a are equiangularly spaced on the ring 170a, and the pawls 180a are equiangularly disposed, it does not necessarily follow, due to tolerances, that all the leaves will open in absolute synchronism. That being the case, it is desirable to have the leaves linked together so that all of the leaves will move in unison. A plurality of links 300 pivotally mounted at 302 and 304 interconnect the actuating mechanism of the leaves so that none of the leaves may open or close until the pawls 180a or 180b have all cleared the notches 182a or 182b respectively of the motors actuating the leaves associated with one ring. In order that the leaves in Figure 5 shall open in unison, it is first necessary for all of the pawls 180a to clear the notches 182a shown in Figure 5 before the leaves can move. As soon as all of the pawls 180a have cleared the shoulders 182a, each of the spring motors actuates its respective leaf into open position in synchronism with the other leaves. Slightly slotted connection between the links and pins means that the links can only be put in tension, never in compression. Therefore, these links can be lighter, due to slots.

In order that the leaves shall make a quick exposure, each leaf travels through the distance A—B shown in Figure 5 before exposure begins. During this movement the leaves are accelerated from zero speed to the speed acquired at this point. This permits the leaves to travel at a high rate of speed from the time that exposure begins until the leaves have opened the entire open area of the iris.

It is equally important that the leaves shown in Figure 6, which terminate the exposure, attain a high rate of speed while traveling over the exposed area through the iris. The leaves are accelerated during the period that the ends of the leaves travel a distance equal to C—D shown in Figure 6. During this period the leaves are accelerated to a high speed, thereby closing the opening very rapidly after the leaves begin to sweep across the exposed area through the iris. The leaves in Figure 6 for a short exposure may be in motion before the leaves in Figure 5 have completed their travel, that is, the leaves closing the aperture for a short exposure may have been accelerated by the time the leaves in Figure 5 have barely uncovered the aperture through the iris. For photographic work in airplanes traveling at high rates of speed at a relatively low altitude, it may be desirable to have an exposure of not more than $\frac{1}{300}$ of a second. This almost infinitesimal period of time necessitates accurate timing of the shutter mechanism. It necessitates the acceleration of both sets of leaves before reaching exposure and shutting position.

The two rings 170a and 170b rotating simultaneously permit accurate release of the shutter tripping mechanism. These rings 170a and 170b may be referred to as shutter tripping rings. The relative initial position of the ring 170a to the ring 170b may be adjusted. This adjustment is accomplished by adjusting member 310 mounted on the side of the housing and provided with a longitudinal slot receiving a roller 312 pivotally mounted to the end of eccentric cam member 222. Member 310 is provided with a pair of vertically disposed slots, as best seen in Figure 14, one of which receives a screw 316 threadedly engaging a threaded stud 317 mounted in the side of the housing. The other slot receives a screw 318 having a sliding contact with member 310. By loosening screw 316, member 310 may be raised or lowered. When it is raised, it will oscillate the cam 222 in a counterclockwise direction, as viewed in Figure 14. When it is lowered, it will oscillate the cam in a clockwise direction and into the extreme position shown in Figure 16. The relative positions of the rings 170a and 170b are thereby controlled.

Furthermore, the rate of speed at which the ring 170b, shown in Figure 6, travels may be reduced by tensioning a spring 320 attached at 322 to the ring 170b, shown in Figure 6, and tensioned by a cable 324 that may be fastened to an adjusting member 326 mounted for adjustment in a longitudinal bearing 328 and terminating in a crank arm 330 journalled upon a crank pin 332 fixedly attached in a disc 334 keyed to a stubshaft 336 provided with a control knob 338 resiliently held in any adjusted position by a helical spring 340. By rotating the control knob 338, the tension of the cable controlling the spring 320 may be adjusted, to thereby counteract the effectiveness of the spring, tending to rotate the ring 170b in a clockwise direction, as shown in Figure 6.

By increasing the tension of the spring 320, its effectiveness in retarding the rotary movement of the ring 170b is increased, so as to cause the ring 170b to rotate at a slower rate of speed, thereby delaying the trigger mechanism releasing the motors actuating the shutter leaf 100b shown in Figure 6, to thereby increase the duration of the exposure. The adjustment of the mechanism for tensioning the spring 320 is utilized to adjust the duration of the exposure. Tensioning this spring increases the time of exposure, releasing the tension of the spring shortens the duration of the exposure.

*Shutter resetting mechanism*

In order to protect the film or plates used in the camera, it is first necessary to close the shutter that has moved into open position, that is, the shutter disclosed in Figure 5. The leaves 100a must be moved into closed position before opening the shutters or leaves 100b shown in Figure 6. As may best be seen by referring to Figure 3, the shutter resetting mechanism includes a shaft 350 journalled in a bearing 352 in the end member 20 and keyed to a gear 354 provided with a stud or crank pin 356. The gear 354 meshes with a pinion 358 keyed to a shaft 360 having mounted on its opposite end a pinion 362 meshing with a gear 364 mounted for rotation upon an axle 366 fixedly attached in the end frame 20 or 22. The gear 364 is provided with a crank pin 368. By rotating the shaft 350, the gears 354 and 364 are rotated in unison.

As may be best seen by referring to Figure 3, the crank pins 356 and 368 are substantially 180° out of phase. A bracket member 370a is fixedly attached to the ring 170a. After exposure, the bracket member 370a has moved into engagement with the crank pin 356. The crank pin 368 does not engage the shoulder of bracket member 370b fixedly attached to the ring 170b. It is to be noted that this ring has now moved in a clockwise direction, so that the bracket is in the dot-dash position. Immediately upon resetting the shaft 150, by any suitable mechanism, the crank pin 356 will engage and actuate the ring 170a into position to reset the leaves 100a and rewind each of the springs 138a of the spring motors. The pawl 224 clears the cam 222, so that the ring 170a is reset without the pawl 224 engaging the cam 222 to reset the ring 170b. After the gears 354 and 364 have been rotated through substantially 180° from the position shown in Figures 5 and 6, the ring 170a and the leaves 100a actuated thereby have been reset to close the opening through the shutter. The crank pin 368 is now in position to engage the bracket member 370b, so as to actuate the ring 170b into exposure position and as this ring rotates, it resets the blades 100b and rewinds the springs 138b of the motors actuating the leaves 100b. The brackets 162 engage the extensions 160 to rewind the respective motors associated with both shutters.

It may be desirable to open both shutters, so as to focus the camera. This is done when the camera is unloaded. This may be accomplished by adjusting a set screw 380 having its inner end 382 advanced inwardly so as to engage a shoulder or extension 234 mounted on the ring 170b. With the set screw adjusted into engagement with the shoulder 234, the springs actuating the ring 170b are then ineffective. By this arrangement, it is merely necessary to release the pawl 212 permitting the ring 170a to trip the motors controlling the leaves 100a, so as to move these leaves to open position, without permitting the ring 170b to trip the motors actuating the leaves 100b. From this it is clear that the leaves 100b remain open and the leaves 100a have moved into exposure position, that is, open position, in which event light flows through the iris of the camera, permitting focusing and observing the view. After the camera has been focused or the view has been observed, the ring 170a may then be actuated by rotating the resetting mechanism, causing the crank pin 356 to actuate the ring 170a and thereby reset the motors actuating the leaves 100a. The set screw 380 may then be unscrewed, so as to clear the shoulder 234, in which event the camera is in readiness to be reset for another exposure upon suitable plates or films being loaded therein.

For convenience of servicing, one shutter together with one lens, or one set of lenses are mounted in one-half of the housing. The other shutter and lens are mounted in the other half of the housing. The halves of the housing may be separated between members 54 and 56, so as to make each shutter available for adjustment, repair or inspection from the center of the housing. The halves of the housing are held together with suitable screws.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A shutter mechanism for use with a dual shutter mechanism for a camera having one shutter for opening the light passage and a second shutter for closing the light passage, said shutter mechanism including a plurality of shutter leaves having an open position and a closed position, a plurality of individual spring motors one for each of the shutter leaves, means for locking the spring motors in wound position, said locking means including a plurality of trigger mechanisms one for each of the motors, means for releasing all of the trigger mechanisms, said last mentioned means simultaneously releasing all of the trigger mechanisms of one shutter, and synchronizing means for synchronizing the movement of the shutter leaves of said one shutter so as to cause the leaves to move in unison from one position to another.

2. In a shutter mechanism for a camera having a dual shutter controlling the light passage, each shutter consisting of a plurality of blades, the blades of one shutter being normally closed and the blades of the other shutter being normally open, a plurality of individual spring motors, one for each of the shutter blades, the combination of a pair of motor control rings for releasing the motors, one for the motors of each of the shutters, with means for interconnecting the rings so as to hold the rings in a relatively fixed position in readiness for exposure.

3. In a shutter mechanism for a camera having a dual shutter controlling the light passage, each shutter consisting of a plurality of blades, the blades of one shutter being normally closed and the blades of the other shutter being normally open, a plurality of individual spring motors, one for each of the shutter blades, the combination of a pair of spring-urged control rings, one for the motors of each of the shutters, with adjustable means for interconnecting the rings so as to hold the rings in a relatively fixed angular position in readiness for exposure, said angular position being adjustable upon the adjustment of said adjustable means.

4. In a shutter mechanism for a camera having a dual shutter controlling the light passage, each shutter consisting of a plurality of blades, the blades of one shutter being normally closed and the blades of the other shutter being normally open, a plurality of individual spring motors, one for each of the shutter blades, the combination of a pair of spring-urged motor control rings, one for the motors of each of the shutters, with means for interconnecting said rings, said means including a bracket member mounted upon one of the rings, said bracket member supporting an adjustably mounted cam, and trigger means attached to the other ring normally engaging the cam to hold said other ring in a fixed relation with respect to the first ring.

5. In a shutter mechanism for a camera having a dual shutter controlling the light passage, each shutter consisting of a plurality of blades, the blades of one shutter being normally closed and the blades of the other shutter being normally open, a plurality of individual spring motors, one for each of the shutter blades, the combination of a pair of motor control rings, one of said rings permitting the motors of one of the shutters to actuate its shutters from closed position to open position, the other ring permitting the motors of the other shutter to actuate its shutters from open position to closed position, means for rotatably mounting the rings to permit the motors to operate, a plurality of springs urging the rings to rotate in one direction, with adjustable means for adjusting the effective tension of the springs.

6. In a shutter mechanism for a camera having a housing for a dual shutter controlling the light passage, each shutter consisting of a plurality of blades, the blades of one shutter being normally closed and the blades of the other shutter being normally open, a plurality of individual spring motors, one for each of the shutter blades, a plurality of triggers one for each motor to hold the springs in tension, the combination including a pair of trigger rings, a plurality of springs for rotating the rings, means for locking one of the rings relative to the housing with the springs in tension, and means for interconnecting the other ring to the first ring so that as the first ring is released the second ring is also released to thereby release the triggers holding the springs to permit the motors to actuate the shutters.

7. In a shutter mechanism for a camera having a housing for a dual shutter controlling the light passage, each shutter consisting of a plurality of blades, the blades of one shutter being normally closed and the blades of the other shutter being normally open, a plurality of individual spring motors, one for each of the shutter blades, a plurality of triggers one for each of the motors to hold the springs in tension, the combination including a pair of trigger rings, a plurality of springs for rotating the rings to release the triggers; means for locking one of the rings relative to the housing with the springs in tension, means for interconnecting the other ring to the first ring so that as the first ring is released the second ring is also released, and means for adjusting the rate of relative angular movement between the rings to thereby adjust the duration of exposure.

8. A camera shutter mechanism including a housing separable into halves, one lens being mounted in one-half of the housing and another lens being mounted in the other half of the housing, a normally closed shutter mechanism mounted in one of the housing halves, a normally open shutter mechanism mounted in the other half of the housing, each of said shutter mechanisms including a plurality of shutter blades and a plurality of spring motors, one for each of the shutter blades, said shutter mechanisms including a pair of trigger rings, one for each of the shutter mechanisms, said trigger rings controlling said shutter mechanisms, and means for synchronizing the movements of the trigger rings so that one shutter mechanism opens the light passage for an exposure and the other shutter mechanism closes the light passage after the exposure.

9. A camera shutter mechanisms including a housing separable into halves, one lens being mounted in one-half of the housing and another lens being mounted in the other half of the housing, a normally closed shutter mechanism mounted in one of the housing halves, a normally open shutter mechanism mounted in the other half of the housing, each of the shutter mechanisms including a plurality of overlapping blades to permit acceleration thereof before effecting the exposure and individual motors for the blades, a plurality of spring motors, one for each of the shutter blades, trigger means for releasably holding the spring motors in tension, and means for synchronizing the movements of the trigger means so that one shutter mechanism opens the light passage for an exposure and the other shutter mechanism closes the light passage after the exposure.

10. In a shutter mechanism for a camera having a dual shutter controlling the light passage, each shutter consisting of a plurality of blades, the blades of one shutter being normally closed and the blades of the other shutter being normally open, a plurality of individual spring motors, one for each of the shutter blades, a plurality of triggers one for each of the motors to hold the springs in tension, the combination of a pair of motor control rings for releasing the triggers, one for each of the shutters, with means for interconnecting the rings so as to hold the rings in a relatively fixed position in readiness for exposure, means for rotating the rings so as to release the triggers, and means for adjusting the relative speed of rotation of the rings to thereby vary the exposure.

11. A dual shutter mechanism for a camera including one shutter for opening the light passage and a second shutter for closing the light passage, each of said shutters including a plurality of shutter leaves having an open position and a closed position, a plurality of individual spring motors one for each of the shutter leaves, means for locking the spring motors in wound position, said locking means including a plurality of trigger mechanisms, one for each of the motors, and means for simultaneously releasing all of the trigger mechanisms of one shutter, said last mentioned means simultaneously releasing all the trigger mechanisms of the other shutter in timed relation to the release of the trigger mechanism of the first shutter.

12. A dual shutter mechanism for a camera including one shutter for opening the light passage and a second shutter for closing the light passage, each of said shutters including a plurality of shutter leaves having an open position and a closed position, a plurality of individual spring motors, one for each of the shutter leaves, means for locking the spring motors in wound position, said locking means including a plurality of trigger mechanisms, one for each of the motors, means for simultaneously releasing all of the trigger mechanisms of the first mentioned shutter, means responding to the first releasing means for subsequently releasing the trigger mechanisms of the second mentioned shutter, and synchronizing means for synchronizing the movement of the shutter leaves of each shutter so as to cause the leaves of each shutter to move in unison from one position to another.

13. In a shutter mechanism for a camera having a dual shutter controlling the light passage, the combination including two sets of shutter blades, the blades of one shutter being normally closed and the blades of the other shutter being normally open, two sets of individual spring motors, there being one set of spring motors for a set of blades, said spring motors of a set being arranged in a circular relation, synchronizing mechanism for synchronizing the movement of said spring motors, said synchronizing mechanism including a plurality of links for holding the motors in the same angular relation, each of said links having elongated slots, studs attached to the motor mechanism and projecting into the slots, said links interconnecting the motors in tension so as to prevent the movement of one motor at a faster rate of speed than the others so as to synchronize the movement of the motors, a pair of trigger means, one for each set of spring motors for holding the spring motors in tension, means for releasing one of the trigger means, and means responding to said releasing means for subsequently releasing the other trigger means so as to cause the blades to open and shut in timed relation to each other.

WILLIAM H. ROBERTSON.

REFERENCES CITED

The following references are of record in the file of this patent:

UNITED STATES PATENTS

| Number | Name | Date |
|---|---|---|
| 284,645 | Little | Sept. 11, 1883 |
| 516,861 | Fawcett | May 20, 1894 |
| 657,833 | Reichenbach et al. | Sept. 11, 1900 |
| 689,982 | Morgan | Dec. 21, 1901 |
| 1,377,366 | Rose | May 10, 1921 |
| 1,626,032 | Fairchild | Apr. 26, 1927 |
| 1,861,257 | Barenyi | May 31, 1932 |
| 1,865,078 | Barenyi | June 28, 1932 |
| 2,232,969 | Ranft | Feb. 25, 1941 |
| 2,344,382 | Aiken | Mar. 14, 1944 |
| 2,350,106 | Fuerst | May 30, 1944 |
| 2,359,116 | Johnson | Sept. 26, 1944 |